US012433280B2

(12) United States Patent
Yasuda

(10) Patent No.: US 12,433,280 B2
(45) Date of Patent: Oct. 7, 2025

(54) FISHING INFORMATION MANAGEMENT SYSTEM

(71) Applicant: GLOBERIDE, Inc., Tokyo (JP)

(72) Inventor: Hiromu Yasuda, Toyko (JP)

(73) Assignee: GLOBERIDE, INC, Tokyo (JP)

( * ) Notice: Subject to any disclaimer, the term of this patent is extended or adjusted under 35 U.S.C. 154(b) by 0 days.

(21) Appl. No.: 17/411,587

(22) Filed: Aug. 25, 2021

(65) Prior Publication Data
US 2022/0061294 A1    Mar. 3, 2022

(30) Foreign Application Priority Data
Aug. 27, 2020    (JP) ................................ 2020-143237

(51) Int. Cl.
*A01K 89/017*    (2006.01)
*A01K 87/00*    (2006.01)
(Continued)

(52) U.S. Cl.
CPC .......... *A01K 97/125* (2013.01); *A01K 87/007* (2013.01); *A01K 89/017* (2013.01); *A01K 89/01931* (2015.05); *A01K 99/00* (2013.01)

(58) Field of Classification Search
CPC ..... A65F 13/818; A65F 13/798; A01K 97/12; A01K 97/00; A01K 99/00; A01K 97/125;
(Continued)

(56) References Cited

U.S. PATENT DOCUMENTS 4,634,072 A  *  1/1987  Stealy ................... A01K 97/20
                                                250/559.07
4,693,125 A  *  9/1987  Krutz .................... A01K 87/00
                                                      43/17
(Continued)

FOREIGN PATENT DOCUMENTS

JP    2006042607 A    2/2006
JP    2017216938 A    12/2017
(Continued)

OTHER PUBLICATIONS

Office Action for related Chinese Application No. 202110966257.2; action dated Sep. 26, 2022; (20 pages).
(Continued)

*Primary Examiner* — Zoe Tam Tran
(74) *Attorney, Agent, or Firm* — Oliff PLC

(57) ABSTRACT

A fishing information management system has a fishing rod to which a fishing reel with a spool is attached, and includes an operation/environment information detector that detects information on operation and environment of operation of fishing tools when in use, a storage that stores the information on the operation and operation environment of the fishing tools when in use, a display that displays said information, wherein the display is capable of displaying at least one of the list view of the information on the operation and operation environment of the fishing tools for each casting and dropping, the detailed view of the information on the operation and operation environment of the fishing tools at the predetermined time of casting and dropping, or the statistical information view of statistical information calculated from the information on the operation and operation environment of the fishing tools for each casting and dropping.

11 Claims, 11 Drawing Sheets

(51) Int. Cl.
*A01K 89/015* (2006.01)
*A01K 97/12* (2006.01)
*A01K 99/00* (2006.01)

(58) Field of Classification Search
CPC ...... A63F 13/798; A63F 13/818; A63B 71/06; G06F 3/048
USPC .................. 43/17, 4.5, 4; 700/90, 91, 92
See application file for complete search history.

(56) References Cited

U.S. PATENT DOCUMENTS

| | | | | |
|---|---|---|---|---|
| 4,697,758 | A * | 10/1987 | Hirose | A01K 89/015 242/223 |
| 5,259,252 | A * | 11/1993 | Kruse | A01K 97/00 177/148 |
| 6,312,335 | B1 * | 11/2001 | Tosaki | A63F 13/245 463/37 |
| 6,584,722 | B1 * | 7/2003 | Walls | A01K 97/00 43/4.5 |
| 7,021,140 | B2 | 4/2006 | Perkins | A01K 97/00 473/219 |
| 7,108,213 | B2 * | 9/2006 | Hitomi | A01K 89/00 33/732 |
| 7,523,881 | B2 | 4/2009 | Hitomi et al. | |
| 8,944,928 | B2 * | 2/2015 | Kaps | G09B 19/0038 473/199 |
| 9,002,663 | B2 * | 4/2015 | Rayor | A01K 97/00 702/42 |
| 9,844,704 | B2 * | 12/2017 | Thurman | A63B 60/46 |
| 10,854,104 | B2 * | 12/2020 | Mettler May | A61B 5/7405 |
| 2002/0151994 | A1 * | 10/2002 | Sisco | A63B 57/207 700/91 |
| 2004/0104863 | A1 | 6/2004 | Hitomi et al. | |
| 2004/0124297 | A1 * | 7/2004 | Steer | A01K 97/125 242/223 |
| 2005/0162976 | A1 * | 7/2005 | Kuriyama | A01K 89/00 367/111 |
| 2006/0266860 | A1 | 11/2006 | Hitomi et al. | |
| 2011/0305369 | A1 * | 12/2011 | Bentley | A61B 5/1128 340/572.1 |
| 2014/0358483 | A1 * | 12/2014 | da Rosa | A01K 97/00 702/188 |
| 2015/0106721 | A1 * | 4/2015 | Cha | G06F 3/0483 715/721 |
| 2016/0030850 | A1 * | 2/2016 | Sophos | A63F 13/30 463/2 |
| 2016/0353725 | A1 * | 12/2016 | Worley, III | A01K 87/007 |
| 2018/0217256 | A1 * | 8/2018 | Stokes | G01K 13/00 |
| 2018/0295826 | A1 * | 10/2018 | Blackadar | H04L 67/535 |
| 2018/0295829 | A1 | 10/2018 | Blackadar et al. | |
| 2019/0095053 | A1 * | 3/2019 | De Wever | G06F 3/0488 |

FOREIGN PATENT DOCUMENTS

| | | |
|---|---|---|
| JP | 2020078253 A | 5/2020 |
| KR | 10-2004-0028523 A | 4/2004 |

OTHER PUBLICATIONS

Japanese Office Action in connection with Japanese Patent Application No. 2020-143237; action mailed on Jun. 13, 2023; (9 pages).
Office Action for related Chinese Application No. 202110966257.2; action dated May 4, 2023; (18 pages).
Oct. 23, 2023 Office Action issued in Korean Patent Application No. 10-2021-0111506.
May 17, 2024 Office Action issued in Korean Patent Application No. 10-2021-0111506.
Sep. 23, 2024 Office Action issued in Korean Patent Application No. 10-2021-0111506.
Jun. 12, 2025 Office Action issued in Chinese Patent Application No. 202311561435.9.

* cited by examiner

| No. | Time | Flying Distance | Deflection of Rod | Winding Speed | Tension | External Device 1 | External Device 2 |
|---|---|---|---|---|---|---|---|
| 5 | 10:15:12 | 27.2m | 10% | 58rpm | 45gf | | |
| 6 | 10:15:58 | 22.3m | 15% | 75rpm | 50gf | | |
| 7 | 10:17:02 | 20.4m | 12% | 40rpm | 38gf | | |
| 8 | 10:17:22 | 12.2m | 60% | 55rpm | 250gf | | |
| ⋮ | ⋮ | ⋮ | ⋮ | ⋮ | ⋮ | | |

FIG. 7

FISHING INFORMATION MANAGEMENT SYSTEM

CROSS-REFERENCE TO RELATED APPLICATIONS

This application claims priority under 35 U.S.C. § 119 to Japanese Patent Application No. 2020-143237 filed on Aug. 27, 2020, in the Japanese Intellectual Property Office, the entire contents of each hereby incorporated by reference.

FIELD

The present disclosure relates to a fishing information management system including a fishing rod to which a fishing reel with a spool capable of winding a fishing line is attached.

BACKGROUND

Generally, when fishing deep-field fish, such as in the case of boat fishing, an electric fishing reel ("fishing reel") has been widely used.

Conventionally, this type of fishing reel is provided with a line-length measuring device that measures the length of a wound or unwound fishing line based on the rotation speed of a spool in order to improve the catch by accurately adjusting the fishing depth, and the values measured by the line-length measuring device appear on a display provided on the reel body.

As such a fishing reel, for example, Japanese Patent Application Publication No. 2006-42607 (Patent Literature 1") discloses a fishing reel including a spool rotatably supported by the side plates of the reel body therebetween, a winding speed detection means that detects the winding speed during the winding operation of a fishing line wound on the spool, and a display that displays the values detected by the winding speed detection means.

SUMMARY

However, in the fishing reel disclosed in Patent Literature 1, detection values of winding speed are displayed on a display provided on the reel body, but are not intended to be transmitted to the outside of the reel. Further, even if the fishing reel information can be displayed, the fishing reel disclosed in Patent Literature 1 only displays specific information of the reel though there are a variety of fishing information, such as a lure, fishing images and a fishing environment. There was, therefore, a problem that the information is extremely limited compared with the information generally wanted by fishermen.

The present disclosure has been made in view of the above circumstances, and the objective thereof is to provide a fishing information management system including a fishing rod to which a fishing reel with a spool capable of winding a fishing line, which can display various fishing information in a selected display mode, is attached. Other purposes of the present disclosure will become apparent upon reference to this specification in its entirety.

A fishing information management system according to an embodiment of the present disclosure has a fishing rod to which a fishing reel with a spool capable of winding a fishing line is attached, and is configured to include an operation/environment information detector (operation/environment information detecting unit or operation/environment information detecting portion) that detects information on operation and operation environment of the fishing tools when in use, including the fishing reel and the fishing rod, a storage (storing unit or storing portion) that stores the information on the operation and operation environment of the fishing tools when in use, a display (displaying unit or displaying portion) that displays said information, wherein the display can display at least one of the list view of the information on the operation and operation environment of the fishing tools for each casting and dropping, the detailed view of the information on the operation and operation environment of the fishing tools at the predetermined time of casting and dropping, or the statistical information view of statistical information calculated from the information on the operation and operation environment of the fishing tools for each casting and dropping.

In a fishing information management system according to an embodiment of the present disclosure, the fishing tools are configured to include at least the fishing reel, the fishing rod, the fishing line, a hook, and a rig. Further, in a fishing information management system according to an embodiment of the present disclosure, the operation environment of the fishing tools is configured to include at least the start time of use, the end time of use, the weather condition during use of the fishing tools, or the place of use of the fishing tools.

In a fishing information management system according to an embodiment of the present disclosure, the operation/environment information detector is configured to include at least a reel operation information detector (reel operation information detecting unit or reel operation information detecting portion) that detects operation information of the fishing reel, and a fishing rod operation information detector (fishing rod operation information detecting unit or fishing rod operation information detecting portion) that detects the operation information of the fishing rod.

In a fishing information management system according to an embodiment of the present disclosure, the operation information of a fishing reel is configured to include at least one of a pulled-out amount of a reel's drag, a pulling-out speed of the reel's drag, a spool rotation start point, a spool rotation end point, a spool diameter, a maximum rotation speed of a spool, a rotation speed history of the spool, a brake setting, a motion of a fishing rod, and backlash information. Further, in a fishing information management system according to an embodiment of the present disclosure, the operation information of a fishing rod is configured to include at least one of the speed, the acceleration, the deformation amount, the motion, and the casing method, of the fishing rod.

In a fishing information management system according to an embodiment of the present disclosure, the statistical information calculated from the information on the operation and operation environment of the fishing tools for each casting and dropping is configured to be displayed on a graph with at least two axes.

In a fishing information management system according to an embodiment of the present disclosure, when the displayed graph has two axes, it is configured so that its vertical axis includes either skill information or bite information, and its horizontal axis includes any one of time, position information, weather information, or operation information.

In a fishing information management system according to an embodiment of the present disclosure, the statistical information is configured to include at least information of hit values related to catching fish.

In a fishing information management system according to an embodiment of the present disclosure, the detailed view of the information on the operation and operation environment of the fishing tools at the predetermined time of casting and dropping is configured to include at least hit values related to catching fish at the predetermined time of casting and dropping or information on the fish caught.

In a fishing information management system according to an embodiment of the present disclosure, the information on the fish caught is configured to include the image data of the fish.

According to the above embodiment, it is possible to provide a fishing information management system that includes a fishing rod to which a fishing reel with a spool capable of winding a fishing line, which can display various fishing information in a selected display mode, is attached.

BRIEF DESCRIPTION OF THE DRAWINGS

FIG. 7 is a diagram illustrating a list view in a fishing information management system according to an embodiment of the present disclosure.

DETAILED DESCRIPTION

Figure 1:
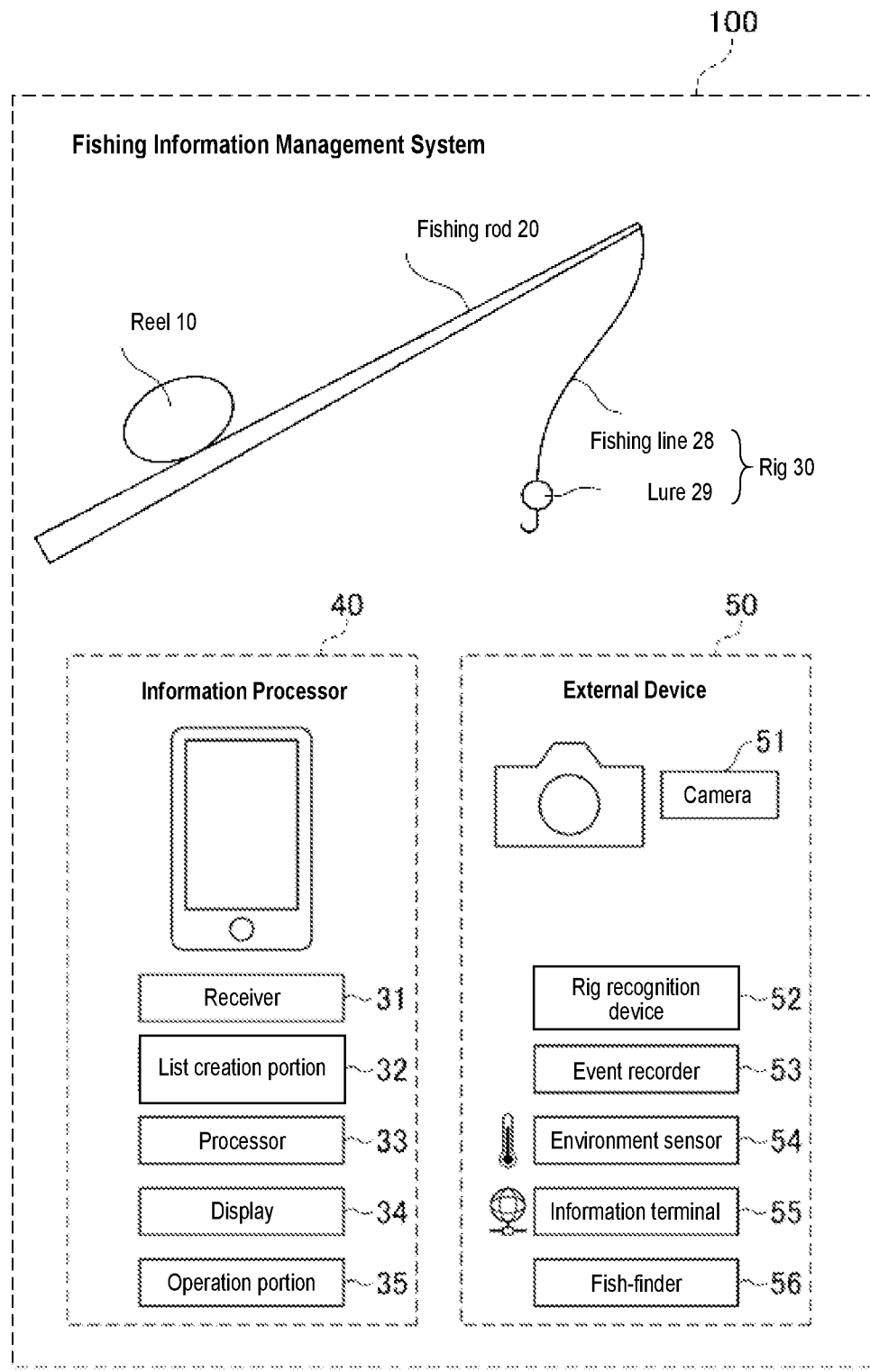
FIG. 1 is a diagram illustrating a fishing information management system according to an embodiment of the present disclosure.

Hereinafter, embodiments of the present disclosure will be described in detail with reference to the accompanying drawings. Components common in the plurality of drawings are denoted by the same reference numerals through the plurality of drawings. It should be noted that each of the drawings is not necessarily scaled for convenience of explanation.

First, the basic configuration of a fishing information management system 100 will be described with reference to FIGS. 1 to 4. FIG. 1 shows the configuration of the fishing information management system 100 according to an embodiment of the present disclosure.

As illustrated, the fishing information management system 100 according to an embodiment of the present disclosure includes a fishing reel 10, a fishing rod 20, a rig 30, a fishing information processor 40 and an external device 50.

Like general fishing reels, the fishing reel 10 can wind a fishing line 28 on a spool 11, switch the state of the fishing line 28 from unwoundable to non-unwoundable and vice versa from the spool 11, and allow the spool 11 to idle (drag function) when a tension equal to or greater than a set value is applied to the fishing line 28, so that the set value of the tension is set as a threshold. Further, the fishing reel 10 adjusts a braking force to prevent the occurrence of a backlash upon casting (only for double-bearing reels). The fishing reel 10 applicable to the present embodiment detects, and transmits to the information processor 40, the above operations and states. The details will be described later.

Like general fishing rods, the fishing rod 20 has the fishing reel 10, and guides the fishing line 28. A user can manipulate the fishing line 28 as necessary by operating the fishing rod 20. The fishing rod 20 applicable to the present embodiment detects, and transmits to the information processor 40, part or all of the operations and states of the fishing rod 20. The details will be described later.

Next, the rig 30 is attached to one end of the fishing line 28, and has a hook 29 to be bitten by a fish. In this embodiment, the hook 29 is attached within a lure (artificial bait) 32. Further, various types of rigs are used depending on the targeted fish or fishing method, and a float, a weight, a ground bait container, and a balance (but not limited thereto) are used as necessary.

In the present embodiment, an operation detection means such as an acceleration sensor is provided in part of the rig, transmits the operation of the lure 32 to the information processor 40. The operation detection means is waterproofed and sealed in part of the rig together with a power source, storage means and communication means as necessary.

The reel 10, the fishing rod 20 and the rig 30 are hereinafter collectively called the "tackle". Further, the information processor 40 accumulates detection results from the respective components constituting the tackle, and produces an operation information list that aggregates the operation information for each commencement of the unwinding of a fishing line. The details will be described later. The information processor 40 may be, for example, a portable information terminal (smart phone). Further, a fishing information processor 10 may be incorporated in a fishing reel 1 or a fishing rod 21 to constitute part thereof. Alternatively, part of the fishing information processor 10 may be incorporated in the fishing reel 1 or the fishing rod 20. Part or all of the information processor 40 may also be located in a server (cloud) on the Internet.

The external device 50 is a device to acquire fishing information that cannot be acquired by the tackle, and can transmit various information to the information processor 40 if provided with a transmitter (transmission unit or transmission portion). The information processor 40 can associate the received information with the operation information list. More specifically, the external device 50 may be configured as an imaging device (camera) 51, a rig recognition device 52, an event recorder 53, an environment sensor 54, an information terminal 55, and a fish-finder 56 (but not limited thereto). The external device 50 may be configured in the same device as the one in which the information processor 40 is, or may be attachable to the reel 10 or the fishing rod 20.

Figure 2A:
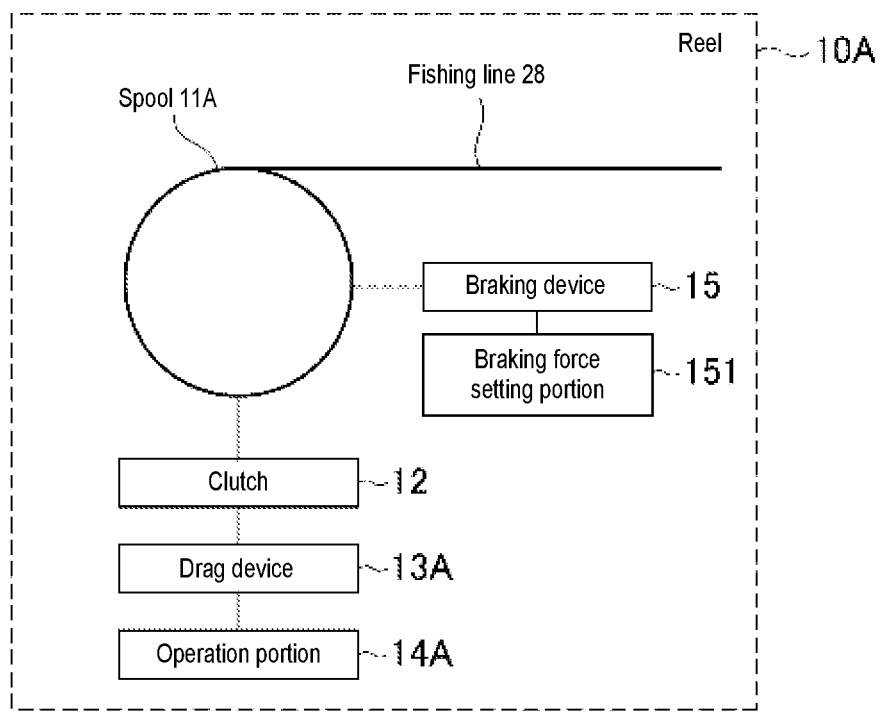
FIG. 2A is a diagram illustrating a fishing reel in a fishing information management system according to an embodiment of the present disclosure.
Figure 2B:
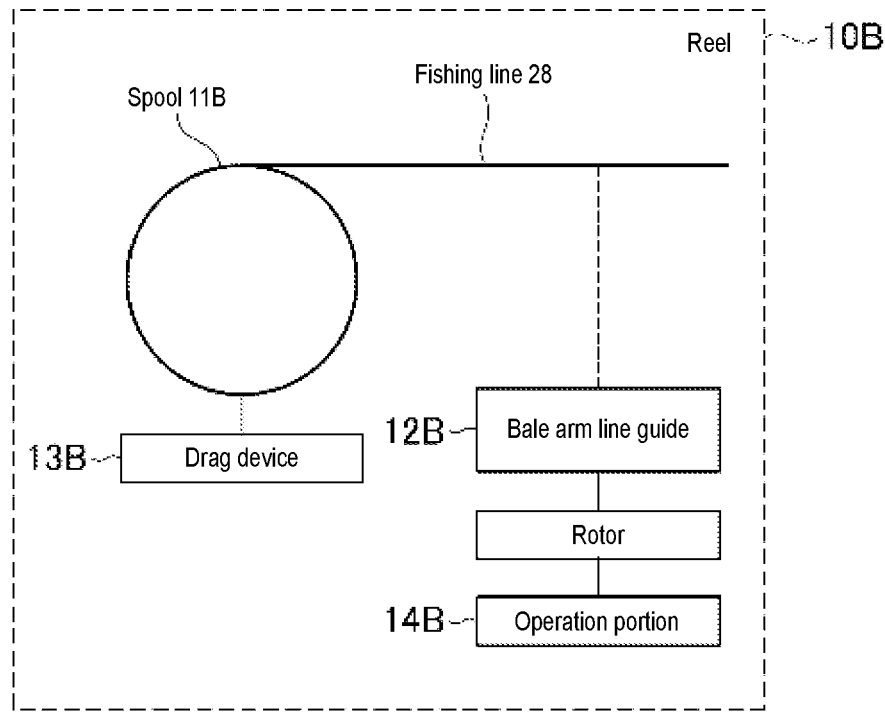
FIG. 2B is a diagram illustrating a fishing reel in a fishing information management system according to an embodiment of the present disclosure.

FIG. 2 is a diagram illustrating a mechanical component configuration of the reel 10. (A) shows a case where a double-bearing-type reel is used as the reel 10, and (B) shows a case where a spinning-type reel is used. First, a double-bearing reel 10A will be described.

A spool 11A can wind the fishing line 28, and it is possible to wind up the fishing line 28 when the spool is rotated forward by an operation portion (operation unit) 14A. For a clutch 12, the connection/disconnection of the power transmission to the operating portion 14A can be selected. In connected state, the operation portion 14A can perform a winding operation. In disconnected state, the spool 11A can be freely rotated in the forward and backward directions, so that the fishing line 28 can be unwound.

A drag device 13 can idle the spool 11 when a load equal to or greater than a set tension is applied to the fishing line 28. Further, the operation portion 14A is configured as, for example, a handle, and transmits the rotation operation by a user to the spool 11A through a transmission mechanism such as a gear, so that the spool 11A can be rotated forward. Incidentally, the operation portion 14 may be a combination of an operation member such as a lever, and a power source such as a motor. A braking device 15 can also exert braking force on the spool. This suppresses the occurrence of backlash upon casting. Said braking force can be set by a braking force setting portion (braking force setting unit) 151.

Next, a spinning reel 10B will be described. A spool 11B is fixed to the reel body via a drag device 13B. The drag device 13B can idle the spool 11 when a load equal to or greater than a set tension is applied to the fishing line 28. The fishing line 28 is guided to a line guide 12B and is wound on the spool 11B by the line guide 12B rotating around the spool 11. The line guide 12B is held at the tip of a rotor rotatably supported with respect to the reel body, and the fishing line 28 can be made guidable or not by opening and closing a bale arm. When the bale arm is open, the line guide 12B becomes not woundable, and the fishing line 28 can be unwound. When the bale arm is closed, the line guide 12B becomes woundable, and the fishing line 28 cannot be unwound.

An operation portion 14B is configured as, for example, a handle, transmits a user's rotation operation to a rotor through a transmission mechanism such as a gear, so that the line guide 12B can be rotated forward.

Figure 3:
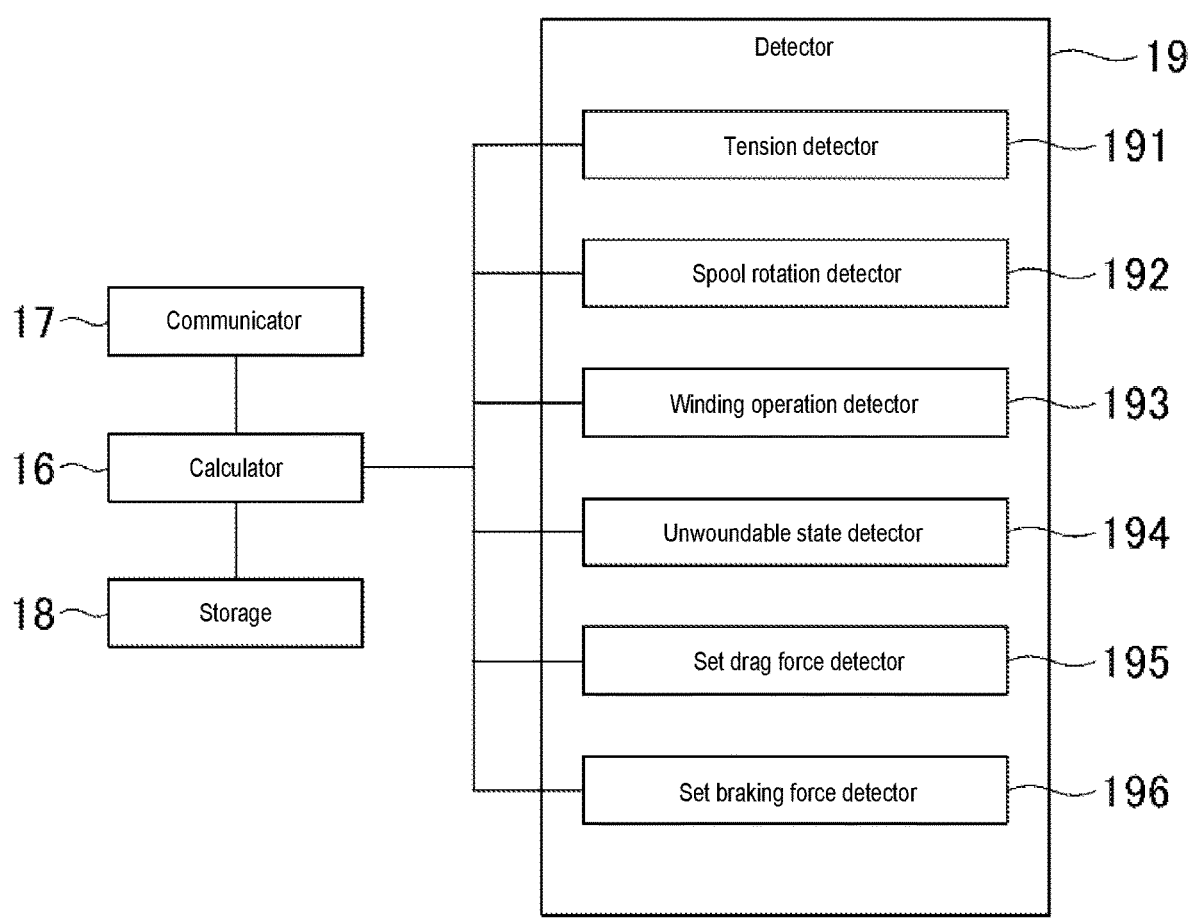
FIG. 3 is a diagram illustrating a fishing reel in a fishing information management system according to an embodiment of the present disclosure.

FIG. 3 shows a basic configuration of the reel 10. The reel 10 has a detector (detecting unit or detecting portion) 19 to detect various operations by a user and the state of the reel. The detection results are sent to a calculator (calculating unit or calculating portion) 16, and are transmitted to the information processor 40 via a communicator (communication unit or communication portion) 17 after arithmetic processing or temporary storage in a storage 18 as necessary. Depending on the detected information or configuration, the detection results may be directly transmitted from the detector 19 to the information processor 40.

The detector 19 includes the followings. Some may be omitted due to limitations of costs, sizes and the like. Further a tension detector (tension detecting unit or tension detecting portion) 191 detects a tension acting on the fishing line 28. It can be realized by techniques known in the art, such as detecting by a strain sensor a force acting on the rotation axis of a pulley that guides the fishing line 28.

A spool rotation detector (spool rotation detecting unit or spool rotation detecting portion) 192 detects the rotation of the spool 11. It can be realized by known means such as an incremental-type rotation sensor using a photo interrupter or magnetic sensor. A non-contact type rotation sensor is desirable to achieve smooth rotation of the spool 11.

A winding operation detector (winding operation detecting unit or winding operation detecting portion) 193 detects the rotation of the operation portion 14. It can be realized by attaching a rotation sensor to the operation portion 14, or a gear or the like that rotates in conjunction with the operation portion 14. It can also be realized by known means such as an incremental-type rotation sensor using a photo interrupter or magnetic sensor. A non-contact-type rotation sensor is desirable to achieve smooth rotation of the operation portion 14. The amount of idling by the drag device 13 can be calculated by taking the difference between the winding operation detector 193 and the spool rotation detector 192.

An unwoundable state detector (unwoundable state detecting unit or unwoundable state detecting portion) 194 detects whether or not the fishing line 28 can be unwound from the reel 10. The above-described exemplary double-bearing reel 10A can be realized by detecting the connection status of the clutch 12. A limit sensor or the like may be attached to part of the member on which the clutch operates. In the exemplary spinning reel 10B, a limit sensor or the like may be attached to part of the member on which the bale arm operates.

A set drag force detector 195 detects a set tension that is a threshold at which the spool 11 idles. It can be realized by, for instance, detecting charging force acting on a friction member in a drag device with a pressure sensor.

A set braking force detector (set braking force detecting unit or set braking force detecting portion) 196 detects a set value of the braking force for backlash suppression. It can be realized by providing a volume resistance or the like to the braking force setting portion 151. In a type of braking device that sets braking force by computer, the set braking force detector 196 can by realized by obtaining a command value to the braking device.

The state and the operation information of the reel 10 can be obtained or calculated by calculating the value obtained by the detector 19 with the calculator 16 as necessary. More specifically, set values of a tension acting on a fishing line, amount of the fishing line wound, pulled-out amount by a drag device, set drag force, unwoundable state, and braking force can be obtained. Further, the winding speed and the amount of tension change, which are the time derivative values of the foregoing, can also be calculated.

Figure 4:
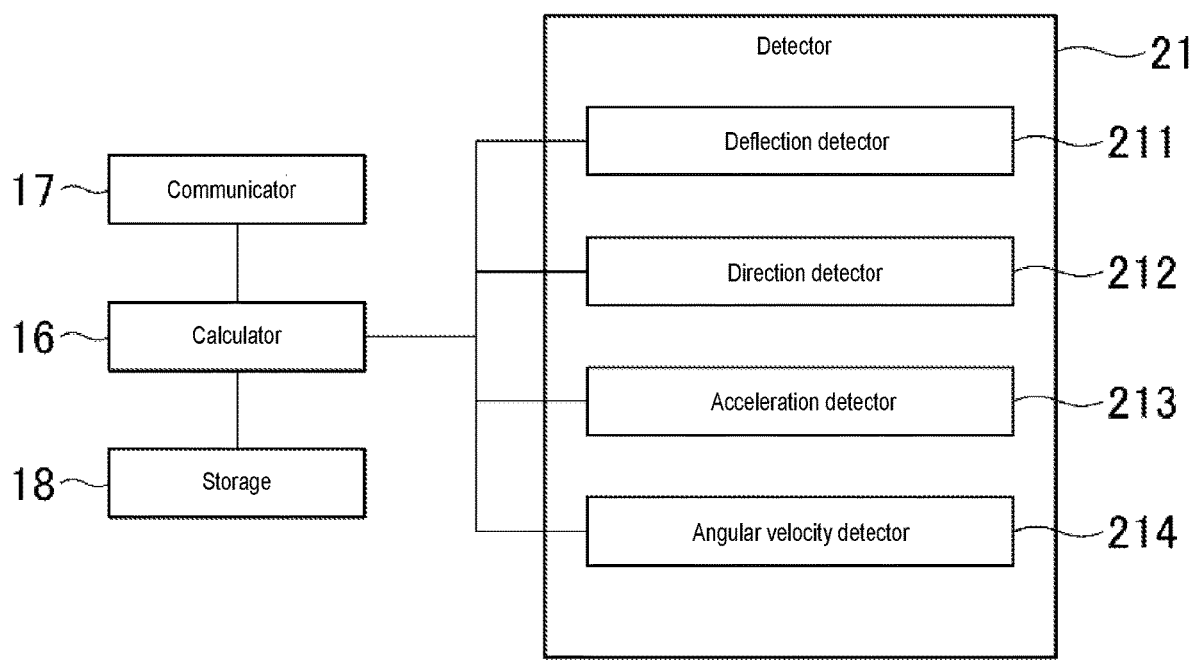
FIG. 4 is a diagram illustrating a fishing rod in a fishing information management system according to an embodiment of the present disclosure.

Next, the basic components of the fishing rod 20 will be described in detail using FIG. 4. The fishing rod 20 has a detector 21 that detects various operations by a user and the state of the fishing rod 20. The detection results are sent to the calculator 16, and are transmitted to the information processor 40 via the communicator 17 after arithmetic processing or temporary storage in the storage 18 as necessary. The calculator 16, the communicator 17, and the storage 18 at this time may be shared with the components of the reel 10 using a wired connection or the like, or may be dedicated to the fishing rod 20, or may be disposed within the reel 10 or on the fishing rod 20.

The detector 21 includes the followings. Some may be omitted due to restrictions on costs, sizes and the like. A deflection detector (deflection detecting unit or deflection detecting portion) 211 detects the deflection (bend) of the fishing rod 20. It can be realized by providing a strain sensor at various portions of the fishing rod 20.

A direction detector (direction detecting unit or direction detecting portion) 212 can detect the direction in which the fishing rod 20 is oriented by detecting the geomagnetic direction. An acceleration detector (acceleration detecting unit or acceleration detecting portion) 213 detects the acceleration in the translation direction of the fishing rod 20. It can be realized using a known acceleration sensor such as a piezoresistive method or a capacitance detection method.

An angular velocity detector (angular velocity detecting unit or angular velocity detecting portion) 214 detects the angular velocity of the fishing rod 20 (speed in the rotation direction). It can be realized using a known gyro sensor such as a method for detecting a frequency change of the vibrated piezoelectric element.

Incidentally, a sensor called a nine-axis motion sensor that detects the direction, acceleration and angular velocity of each of orthogonal three axes can be used as the direction detector 212, the acceleration detector 213, and an angular velocity detector (angular velocity detecting unit or angular velocity detecting portion) 214. Hereafter, these are called motion sensors. The attitude and the operation of the fishing rod 20 can be obtained by calculating the detection results described above. The motion sensor may be disposed in the reel 10.

Next, a processing method of the detection results obtained from the detectors 19 and 21 will be described. In general, a user repeatedly casts and retrieves a rig as follows during fishing:

(1) operating a clutch or a bale arm to enable the fishing line 28 to be unwound;
(2) casting out a rig swinging a fishing rod or dropping a rig due to the gravity of a weight to unwind the fishing line 28;
(3) enabling the fishing line 28 to be wound (not to be unwound) by following the procedure opposite to the one in (1) when the rig reaches a predetermined spot;
(4) waiting for a fish bite by means appropriate for a fish species or fishing method, such as operating an operating means 14 by, for example, letting the lure swim or remain as it is;
(5) operating the operating means 14 to wind the fishing line 28, and retrieving the rig when a fish is caught or a predetermined time has elapsed; and
(6) collecting the fish caught, or replacing the bait and the lure as necessary when completing the winding-up, and starting the operation in (1) again.

Therefore, the operation information accumulated in the information processor 40 is easily understandable to users and is useful, if listed for each casting of a rig (each commencement of the unwinding of a fishing line). In the embodiments of the present disclosure, the operation information can be displayed in three modes: a list view, a detailed view, and a statistical information view.

Figure 5:
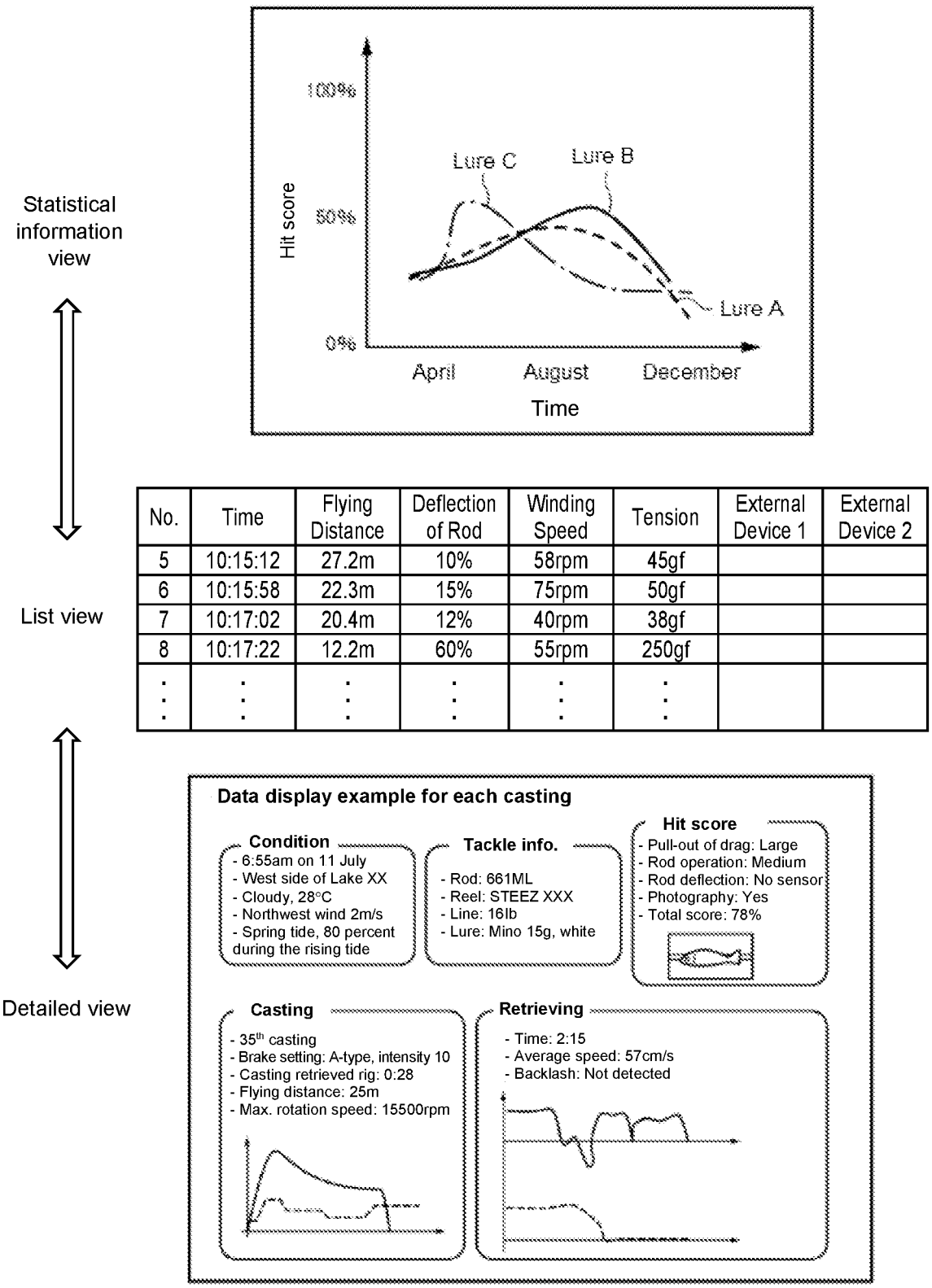
FIG. 5 is a diagram illustrating a display image of each mode in a fishing information management system according to an embodiment of the present disclosure.

In the list view, the detection results are displayed as a list. This enables to use a search function to select detailed information and to obtain an overview of all data. In the detailed view, the detailed information can be displayed for each casting. This enables to grasp detailed events and states upon casting. Further, in the statistical information view, the temporal change of each data and the correlation between the data can be displayed. This enables to grasp the long-term trend of each item. FIG. 5 shows a display image of each mode. A user can switch each display mode by manipulating an operation portion 35.

A method for listing the detection results obtained from the respective detectors 19 and 21 for each casting of a rig will be described. By detecting the commencement of casting of the rig, each detection result can be divided for each casting.

First, a method for detecting the commencement of casting of a rig will be described. For the double-bearing reel 10A, the above (1) is recognized by detecting that the clutch 12 is turned off from on with the unwoundable state detector 194. Thereafter, the above (2) is recognized by detecting the commencement of the rotation of the spool 11A with the spool rotation detector 192.

Further, the above (3) is recognized by detecting that the clutch 12 is turned on from off with the unwoundable state detector 194. When these (1) through (3) occur in succession, it can be assumed that the commencement of the unwinding of the fishing line 28 has been detected.

In another method, it can be assumed that the unwinding of the fishing line has commenced when the commencement of the rotation of the spool 3 is detected after the length of the unwound fishing line becomes equal to or less than a predetermined value. In this method, though it is necessary to accurately calculate the length of the unwound fishing line, it is possible to detect the unwinding of the fishing line without using the unwoundable state detector 194.

For the spinning reel 10B, the spool 11B does not rotate when the fishing line 31 is unwound. It is, therefore, difficult for the detector in the reel 10B to recognize (2). However, (1) is recognized by detecting with the unwoundable state detector 194 that the bale becomes open, and thereafter (3) is recognized by detecting that the bale becomes closed. Thus, the commencement of the unwinding of the fishing line 28 can be deemed to have been detected.

Figure 6:
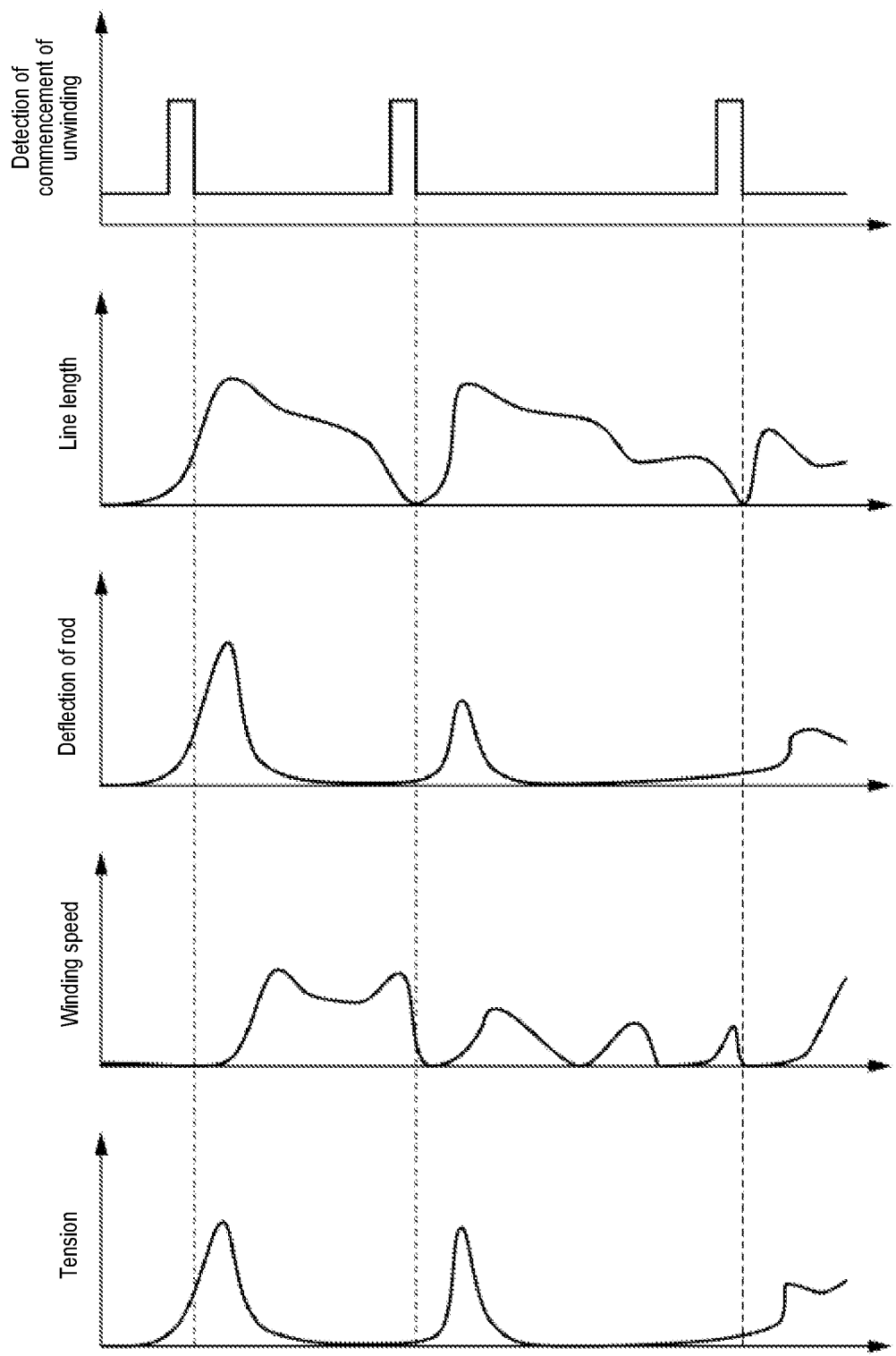
FIG. 6 is a diagram illustrating operation information in a fishing information management system according to an embodiment of the present disclosure.

The detector 19 of the reel 10 and the detector 21 of the fishing rod 20 output various detection results when the tackle is operated. The output results are calculated as necessary to obtain operation information. Examples of the operation information include a length of an unwound fishing line, a bending of a fishing rod, a winding speed of an operation means, and a tension of a fishing line, which are shown in FIG. 6.

Examples of other operation information include the length of a fishing line pulled out by a drag device, unwoundable state of the fishing line, set drag force, set value of a braking force of a braking device, elevation angle of a fishing rod, a translational speed, and a rotational speed.

The obtained operation information is divided for each timing when a fishing line unwinding detector (fishing line unwinding detecting unit or fishing line unwinding detecting portion) 22 detects the unwinding of a fishing line. An operation information list can be created by arranging the foregoing in order. FIG. 7 shows an example of a list view created by extracting operation information for each commencement of the unwinding of a fishing line. In the list view, all types of data obtained may be displayed, or some items may be hidden in order to improve visibility. Further, the minimum, maximum and average values, and the like of each item may also be displayed. Moreover, all unwinding data obtained may be listed, or casting data obtained within a certain period of time, such as daily or monthly, may also be listed. When, in this list view, selecting any unwinding data to be displayed in detail, it is possible to jump to the detailed view. When selecting any type of data to be displayed in the statistical information view, it is possible to jump to the statistical information view.

Figure 8:
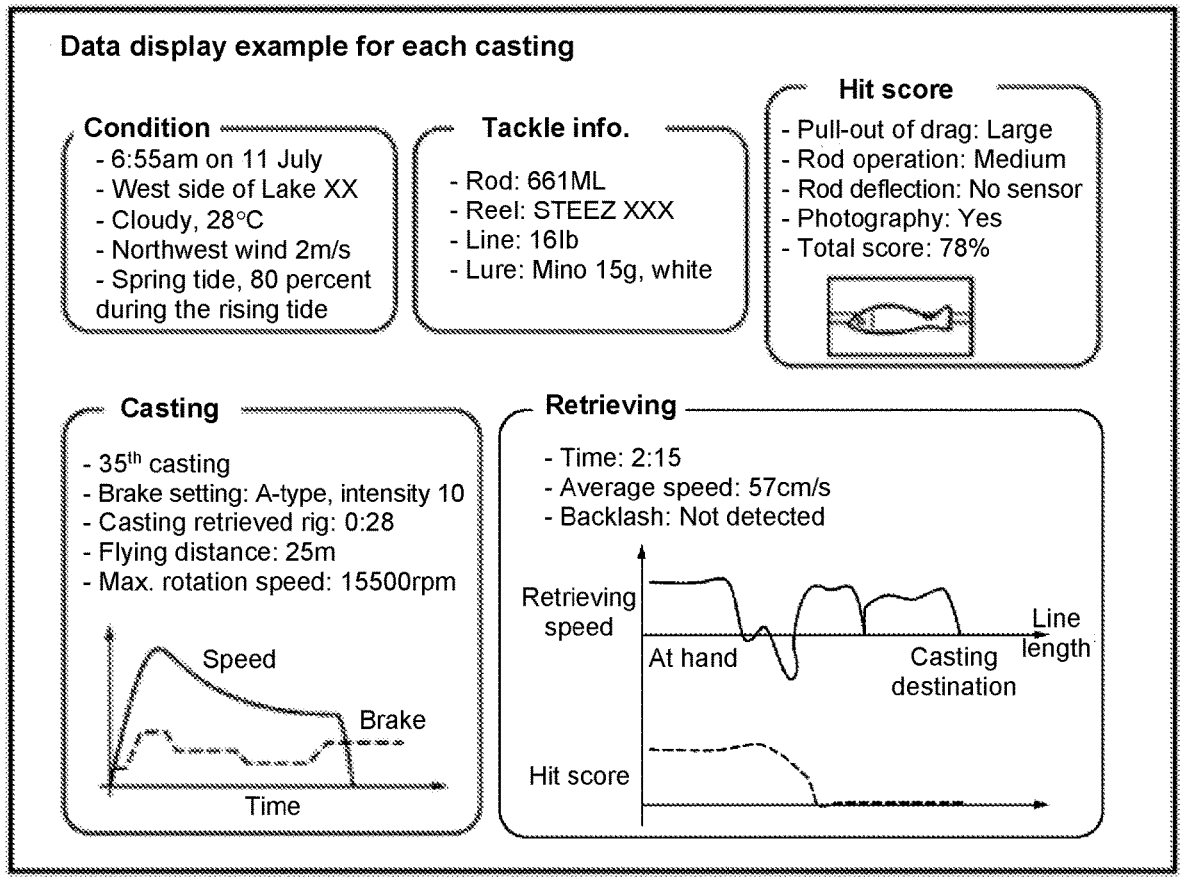
FIG. 8 is a diagram illustrating a detailed view in a fishing information management system according to an embodiment of the present disclosure.

Next, a detailed view will be described with reference to FIG. 8. FIG. 8 shows an example of a detailed view relating to a single casting. Here, all types of fishing data obtained or calculated can be displayed. In this example, said data, which is divided into five tabs, is displayed. The condition tab displays information about fishing spots and the weather there. It is possible to display environmental information on temperature and humidity obtained from not only the detectors 19 and 21 provided in the tackle, but also from the environment sensor 54, as well as position information and weather information obtained using an information terminal. Further, a user may also be allowed to directly input data to the information processor 40.

The tackle information tab displays information about the tackle in use. The tackle information may be manually input by a user to the information processor 40, or may be obtained by reading, with the rig recognition device 52, each tackle to which a means of identification such as a RFID tag is attached.

The casting tab displays information about the state of the tackle and a user's operations from the commencement to the completion of casting of a rig (from (1) to (3) above). The temporal changes of the speed and position of a fishing line and a spool, and a set braking force of the braking device 15 are displayed. The operation of the fishing rod 20 upon casting (angular velocity and elevation angle change) may also be displayed. When the spinning reel 10B is used as the reel 10, since the spool 11B does not rotate upon casting of a rig, less data may be obtained. In such a case, the casting tab may be omitted.

The retrieving tab displays information about the state of the tackle and a user's operations from the completion of casting, to the completion of retrieval, of a rig ((4) and (5) above). Temporal changes of a speed and position of a fishing line and a spool, temporal changes in a tension, and the presence or absence of a backlash are displayed.

Further, in FIG. 8, hit scores obtained by evaluating the possibility that a fish has bitten into a rig are displayed. When a fish bites into the rig, changes arise, which include the facts that a tension acts, that a spool is rotated backward by a drag device due to an excessive tension, and a fishing rod bends. Further, in many cases when having a tug of a fish, a user raises the fishing rod and winds the reel and then, takes pictures of a fish caught. By detecting and calculating these changes, hit scores showing the possibility that a fish has bitten into a rig can be obtained. The conditions of catches can be recorded by displaying the hit score values in synchronization with changes in the line length and the speed. Temporal changes in the retrieving speed and hit scores can be seen in a graph with time on the horizontal axis. Changes according to the position of a rig can be seen in a graph with a line length on the horizontal axis.

Since reactions vary when a fish bites, it is not easy to accurately calculate the hit scores. Therefore, the hit score tab enables a user himself/herself to make a judgement by collecting and displaying information that can serve as a basis for the calculation. In this example, the items displayed include the pull-out amount of a drag, whether or not a rod is operated, the photographed image information, and the maximum value of calculated hit scores. Further, an optional comment field may also be provided for users.

Next, the statistical information view will be described in detail. In the statistical information view, the acquired and calculated data are organized and displayed in a graph in order to enable visual and effective understanding of said data. In the event of displaying in a graph, since a display of the information processor 40 such as a smartphone is used in the present embodiment, it is also possible to use a three-axis graph by animatedly or stereoscopically displaying the data. As such graphically displayed data is somewhat complex, it is not always easy to understand the data. In this case, however, two items can be selected to be depicted on two axes to make it easier to understand.

On the other hand, in the present embodiment, a total of about ten types of sensors are used as the detectors 19 and 21, but the sensors are not limited thereto. Further, many pieces of information can also be calculated from a combination thereof or acquired from external devices. The number of possible combinations of the items to be selected from said pieces of information and depicted on a graph with two axes is enormous. Some may be beneficial to users, and some may be less important. Therefore, the followings are the suggested items to be graphically depicted, which may be beneficial to the users.

First, each acquired or calculated data is classified into the following four categories:
  (a) operation information: information on the operation of the tackle;
  (b) condition information: information on fishing conditions;
  (c) bite information: information on bites; and
  (d) skill information: information on the fishing tool handling skills.

The operation information is information determined by a user's active operation. Specifically, this includes information on the tab of tackle information, information on brake settings, and information on a retrieving speed.

The condition information is information on a usage environment for fishing, and specifically includes information on the condition tab.

The bite information is information on phenomena arising when a fish bites a hook. A user's reactions when getting a bite may also be included. More specifically, the bite information includes information on the hit scores and hit score values calculated based on said information. Calculating reliable hit score values requires many elements; however, obtaining a single value by calculating said scores is useful for graphical display purpose.

The skill information is information on fishing tool handling skills. The information is determined according to a user's skill level, and more specifically, includes information on a flying distance, occurrence of a backlash, a time required to retrieve a rig and cast out the rig again, and the like.

Since the above method is to classify information in terms of the role and meaning of each data, the information can be differently classified depending on the conditions and its interpretation even with the same physical quantity. For example, when a rig is cast to a distance, the length of an unwound fishing line is classified in the skill information as the casting distance varies depending on the skill level. Winding up a rig dropped on the sea floor to a particular depth does not require an operation skill and therefore, is appropriately classified in the operation information.

In order to display more useful information for a fisherman, the two axes of a graph may be set as follows:
  vertical axis: either of the skill information or the bite information; and
  horizontal axis: either of the condition information (including changes over time) or the operation information.

Further, a plurality of pieces of the operation information such as tackle types and the condition information such as fishing spots may be displayed on the graph as different plots.

Narrowing down the items on the two axes of a graph to be displayed in this manner makes it possible to efficiently select a graph useful for the user. Next, the specific examples of the foregoing will be described with reference to FIGS. 9 to 12.

Figure 9:
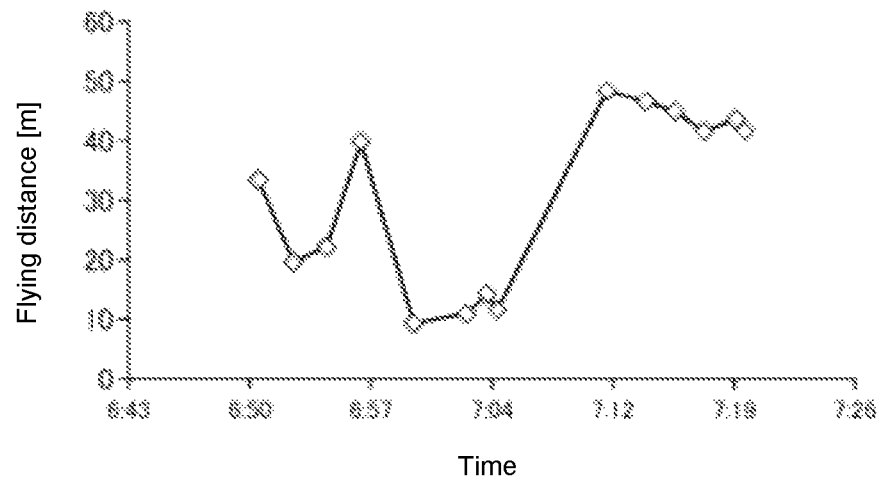
FIG. 9 is a diagram illustrating a graph display example in a fishing information management system according to an embodiment of the present disclosure.
Figure 9:
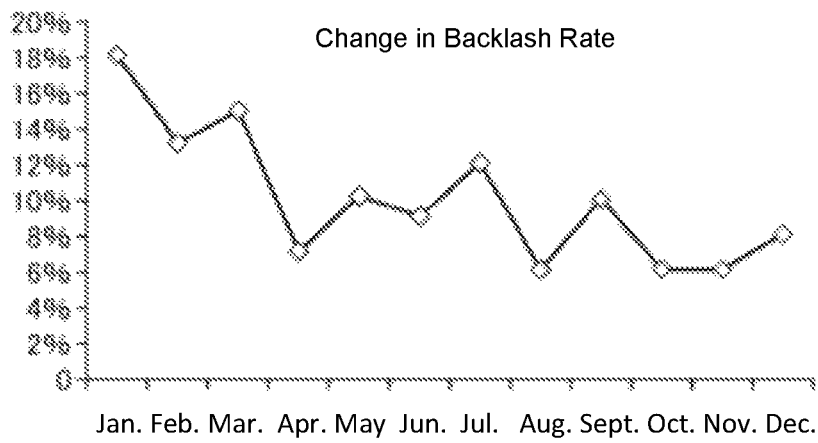
Figure 9:
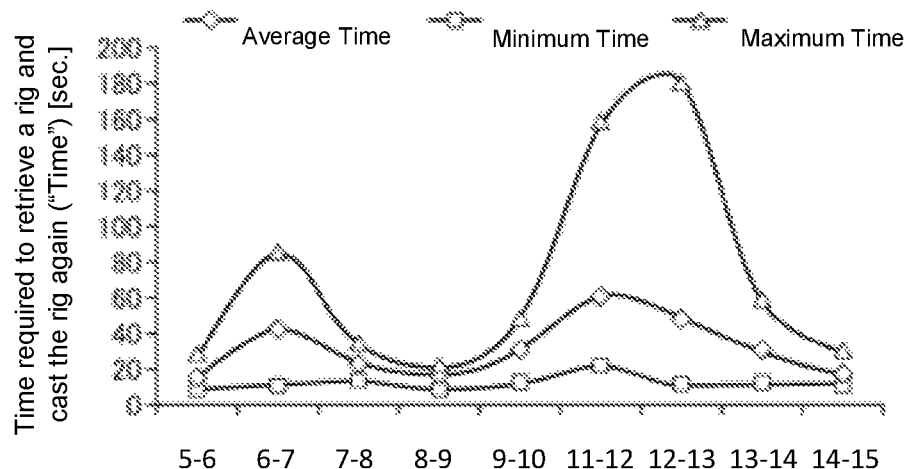

FIG. 9 shows an example in which the horizontal axis represents time and the vertical axis represents the skill information. The vertical axis represents a flying distance in (1), backlash in (2), and a time required to retrieve a rig and cast out the rig again in (3). This enables a user to grasp changes in respective skill information over time. When the time axis is displayed in seconds or minutes, it is possible to grasp changes over time within each fishing run. In this case, it is preferable that the vertical axis represents a flying distance for each casting.

When the time axis is displayed in days or months, it is possible to grasp changes in the skill information over long period. In this case, it is preferable that the vertical axis represents the maximum flying distance within a certain period of time (e.g., one day).

Other skill information that may be used includes, but is not intended to be limited to, the total flying distance, and the maximum spool speed. By displaying time on the horizontal axis and the skill information on the vertical axis like this, the user can enjoy a sense of accomplishment and can be encouraged to have an improved rewarding sense of satisfaction.

Figure 10:
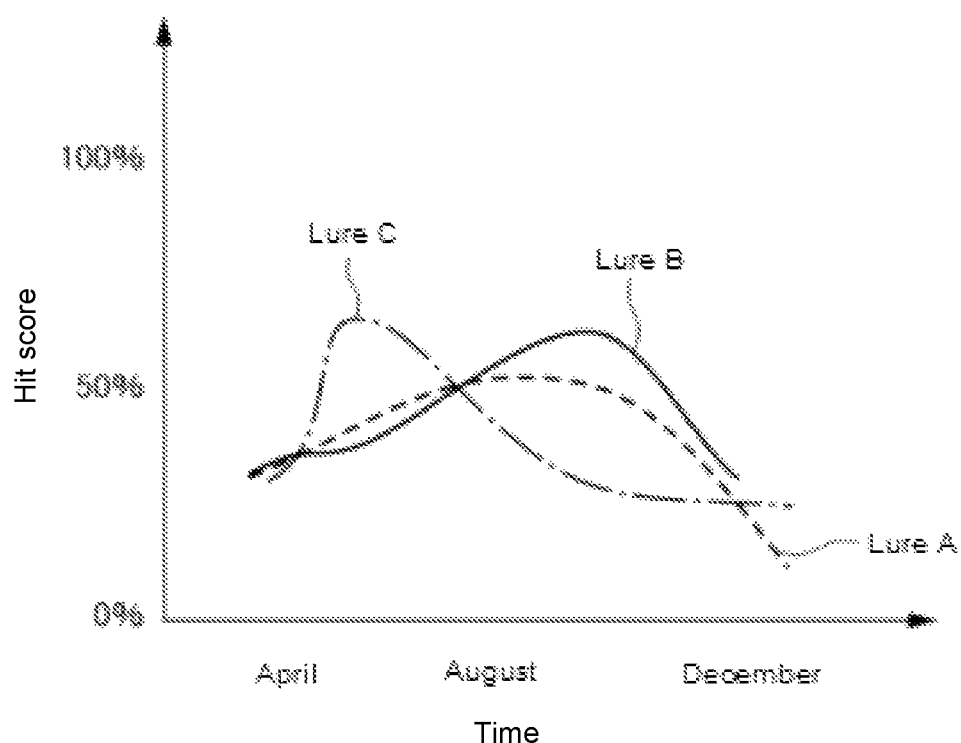
FIG. 10 is a diagram illustrating a graph display example in a fishing information management system according to an embodiment of the present disclosure.

In the example in FIG. 10, the horizontal axis represents time as the condition information, and the vertical axis represents hit scores as the bite information, which enables users to grasp changes in catches over time. Further, by changing the plot for each fishing spot or tackle in use, useful selection information to improve the catches can be displayed. Moreover, other condition information to be represented on the horizontal axis includes, but not limited to, location information (fishing spot information), and weather information such as temperature, water temperature, humidity, wind force, and tidal shift. Displaying the condition information on the horizontal axis and the bite information on the vertical axis in this manner helps selecting a condition for improved catches.

Figure 11:
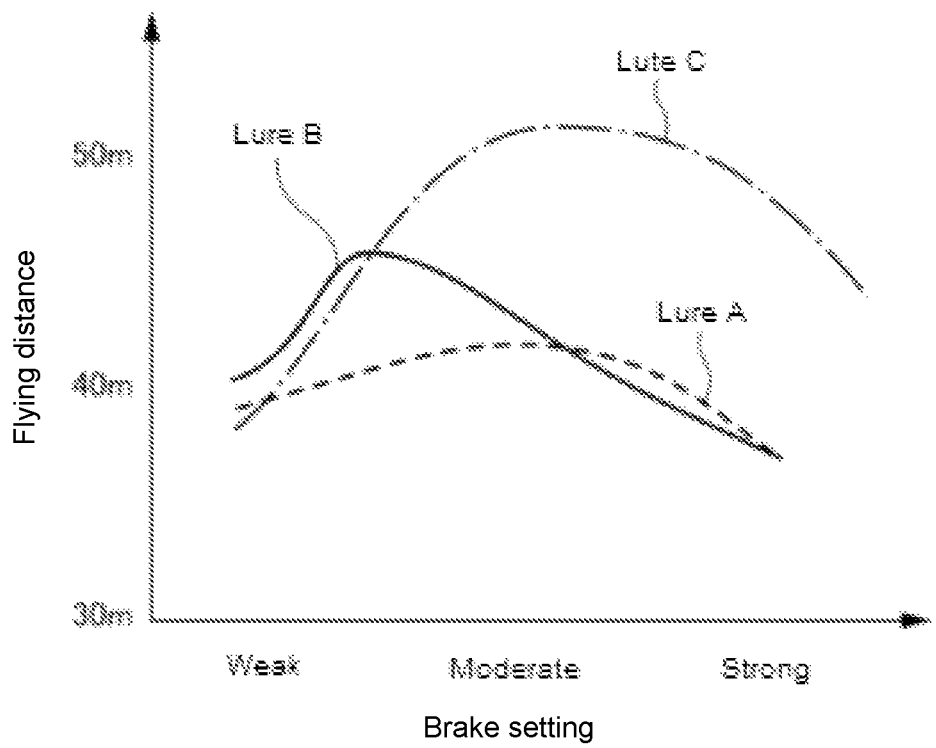
FIG. 11 is a diagram illustrating a graph display example in a fishing information management system according to an embodiment of the present disclosure.

Next, in the example in FIG. 11, the horizontal axis represents a set value of a braking force as the operation information, and the vertical axis represents a flying distance of a rig as the skill information. This enables a user to statistically grasp an optimum braking force to cast a rig to a distance. By changing the plot for each tackle, the braking force can be accurately optimized in wider conditions.

Other possible operation information includes the tackle when in use, a length of an unwound fishing line, and a set drag force. Further, other possible skill information includes a total flying distance, a maximum spool speed, an incidence of backlash, and a time required to retrieve a rig and cast out the rig again. Displaying the operation information on the horizontal axis and the skill information on the vertical axis in this manner helps more effectively operating fishing tools.

Figure 12:
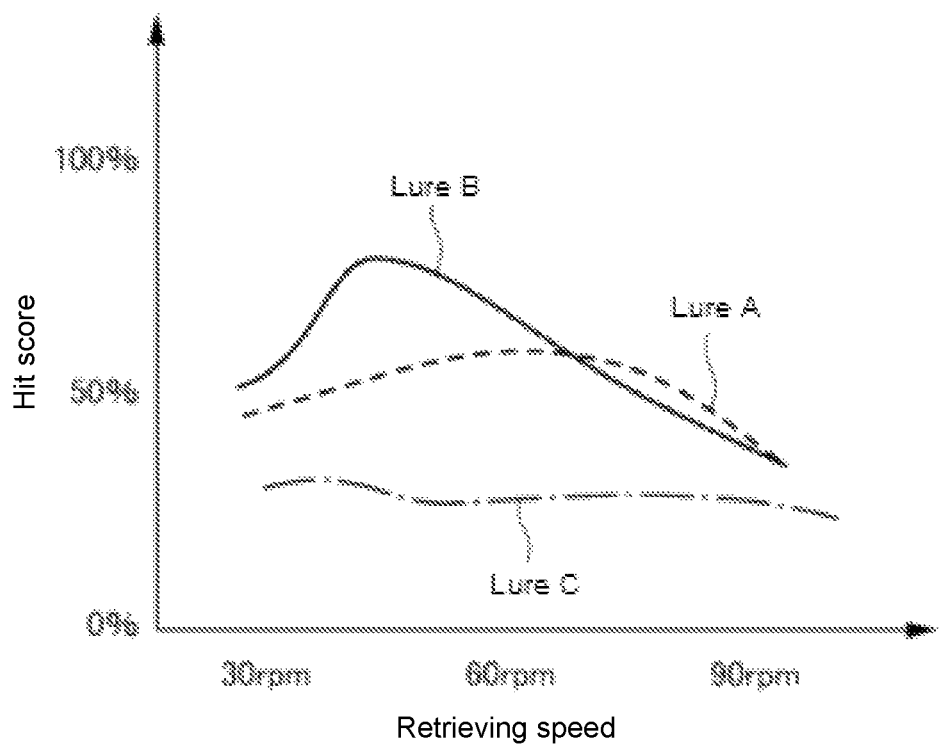
FIG. 12 is a diagram illustrating a graph display example in a fishing information management system according to an embodiment of the present disclosure.

In the example in FIG. 12, the horizontal axis represents a retrieving speed as the operation information, and the vertical axis represents hit scores as the bite information. This enables a user to grasp a retrieving speed at which a fish is easily caught. An optimum retrieving speed for each lure may also be grasped by changing the plot for each lure. Other possible operation information includes a tackle when in use, a length of an unwound fishing line, and a set drag force. Displaying the operation information on the horizontal axis and the bite information on the vertical axis helps performing an operation to improve catches.

In the statistical information view according to the embodiments of the present disclosure, selecting two items to be used for graphical display from the options referred to above makes it possible to efficiently display various fishing information in a selected display mode, which is useful for a user.

Here, the fishing rod 21 can be configured to include an operation information detector that detects the operation information of the fishing rod, and a transmitter (transmitter/receiver (receiving unit or receiving portion)) that transmits the operation information of the fishing rod.

Next, as illustrated in FIG. 1, the fishing information processor 10 includes a receiver 31 that receives information on the operation and operation environment of fishing tools from the fishing reel 1 and the fishing rod 21, a storage 33 that stores information on the operation and operation environment of the fishing tools when in use, and a display 34 that displays said information, wherein the display can display at least one of the list view of the information on the operation and operation environment of the fishing tools for each casting and dropping, the detailed view of the information on the operation and operation environment of the fishing tools at the predetermined time of casting and dropping, or the statistical information view of statistical information calculated from the information on the operation and operation environment of the fishing tools for each casting and dropping. The fishing information processor 10 further includes a processor (processing unit or processing portion) 32, wherein the processor 32 generates and processes display information, using the information on the operation and operation environment of fishing tools, for the list view of the information on the operation and operation environment of the fishing tools for each casting and dropping, the detailed view of the information on the operation and operation environment of the fishing tools at the predetermined time of casting and dropping, or the statistical information view of statistical information calculated from the information on the operation and operation environment of the fishing tools for each casting and dropping.

Next, the fishing information management system 100 according to an embodiment of the present disclosure will be described. The fishing information management system 100 according to an embodiment of the present disclosure is configured to include the fishing reel 1, the fishing rod 21, and the fishing information processor 10.

More specifically, the fishing information management system 100 according to an embodiment of the present disclosure has the fishing rod 21 to which the fishing reel 1 with a spool 3 capable of winding a fishing line is attached, and includes the operation/environment information detector 22 that detects information on the operation of the fishing tools and the operation environment when the fishing tools including the fishing reel 1 and the fishing rod 21 are used, the storage 33 that stores the information on the operation and operation environment of the fishing tools when in use, and the display 34 that displays said information, wherein the display is configured to be capable of displaying at least one of the list view of the information on the operation and operation environment of the fishing tools for each casting and dropping, the detailed view of the information on the operation and operation environment of the fishing tools at the predetermined time of casting and dropping, or the statistical information view of statistical information calculated from the information on the operation and operation environment of the fishing tools for each casting and dropping.

The fishing information management system 100 according to an embodiment of the present disclosure makes it possible to provide a fishing information management system including a fishing rod to which a fishing reel with a spool capable of winding a fishing line is attached, and that can display various fishing information in a selected display mode. In this manner, a fisherman can check various fishing information in a desired display mode, which can significantly improve or increase the fisherman's satisfaction with, and interest in, fishing.

In the fishing information management system 100 according to an embodiment of the present disclosure, the fishing tools are configured to include at least the fishing reel, the fishing rod, the fishing line, a hook, or a rig.

In the fishing information management system 100 according to an embodiment of the present disclosure, the operation environment of the fishing tools is configured to include at least the start time and the end time for the use of the fishing tools, a weather condition when the fishing tools are used, or a location where the fishing tools are used.

In the fishing information management system 100 according to an embodiment of the present disclosure, the operation/environment information detector 22 is configured to include at least a reel operation information detector 23 that detects the operation information of the fishing reel 1, and a fishing rod operation information detector 24 that detects the operation information of the fishing rod 21.

In the fishing information management system 100 according to an embodiment of the present disclosure, the operation information of the fishing reel 1 is configured to include at least one of a pulled-out amount or a pulling-out speed of a reel's drag, a spool rotation start point, a spool rotation end point, a spool diameter, a maximum rotation speed of a spool, a rotation speed history of the spool, a brake setting, a motion of a fishing rod, and backlash information.

In the fishing information management system 100 according to an embodiment of the present disclosure, the operation information of the fishing rod 20 is configured to include at least one of a speed, an acceleration, a deformation amount, and a motion of, and a method of casting, a fishing rod.

In the fishing information management system 100 according to an embodiment of the present disclosure, the statistical information view of statistical information calculated from the information on the operation and operation environment of the fishing tools for each casting and dropping is configured to be depicted on a graph with at least two-axis.

In the fishing information management system 100 according to an embodiment of the present disclosure, in the event the displayed graph referred to above has two axes, the vertical axis is configured to represent either of the skill information or the bite information, and the horizontal axis is configured to represent any of time, position information, weather information, or the operation information.

In the fishing information management system 100 according to an embodiment of the present disclosure, the statistical information is configured to include at least hit values related to catching fish.

In the fishing information management system 100 according to an embodiment of the present disclosure, the detailed view of the information on the operation and operation environment of the fishing tools at the predetermined time of casting and dropping is configured to include at least hit values related to catching fish at said predetermined time of casting and dropping or the information on the fish caught. Further, in the fishing information management system according to an embodiment of the present disclosure, the information on the fish caught is configured to include the image data of the fish.

The dimensions, materials and arrangements of each component described herein are not limited to those explicitly described in the embodiments, and each component can be modified to have any dimension, material and arrangement that can be included within the scope of the present disclosure. Further, components that are not explicitly described herein may be added to the described embodiments, or some of the components described in each embodiment may also be omitted.

DESCRIPTION OF THE NUMERICAL REFERENCES

10 Fishing reel (reel)
11 Spool
12 Clutch
14 Operation portion
15 Braking device
16 Calculator
17 Communicator
18 Storage
19 Detector
20 Fishing rod
21 Detector
22 Operation/environment information detector
23 Reel operation information detector
24 Fishing rod operation information detector
25 Transmitter (transmitter/receiver)
28 Fishing line
29 Hook
30 Rig
31 Receiver
32 List generator
33 Processor
34 Display
35 Operation portion
50 External device (external equipment)
51 Camera
52 Rig recognition device
53 Event recorder
54 Environment sensor
55 Information terminal
56 Fish-finder
100 Fishing information management system
191 Tension detector
192 Spool rotation detector
193 Winding operation detector
194 Unwoundable state detector
195 Set drag force detector
196 Set braking force detector
211 Deflection detector
212 Direction detector
213 Acceleration detector
214 Angular velocity detector

What is claimed is:

1. A fishing information management system including fishing tools that has a fishing rod to which a fishing reel with a spool capable of winding a fishing line is attached, comprising:
    an operation/environment information detector configured to detect information on operation and operation environment of the fishing tools when in use including the fishing reel and the fishing rod, the operation/environment information detector being configured to detect unwinding of the fishing line;

a storage configured to store the information on the operation and operation environment of the fishing tools when in use, the information on the operation and the operation environment being:
  categorized into a plurality of types of information,
  divided for each timing when the operation/environment information detector detects unwinding of the fishing line, and
  arranged in sequence so as to be listed; and
a processor programed to
  cause a display to display:
    a list view having the plurality of types of information on the operation and operation environment for each of a plurality of times of casting and dropping, the plurality of types of information on the operation and operation environment being selectable by a user and the plurality of times being selectable by the user,
    a detailed view of the information on the operation and operation environment of the fishing tools at a first time of the plurality of times, and
    a statistical information view of statistical information calculated from the information on the operation and operation environment of the fishing tools for each casting and dropping, wherein the statistical information view comprises a graph having a first axis representing a hit score and a second axis representing a rig retrieving speed, and wherein a display mode of the display is switchable among the list view, the detailed view, and the statistical information view,
  in response to the first time of the plurality of times being selected by the user, switch from the list view to the detailed view of the first time of the plurality of times, and
  in response to a first type of the plurality of types of information on the operation and operation environment being selected by the user, switch from the list view to the statistical information view, the statistical information view including the information on the operation and operation environment of the fishing tools for the first type.

2. The fishing information management system according to claim 1, wherein the fishing tools include at least the fishing reel, the fishing rod, the fishing line, a hook, or a rig.

3. The fishing information management system according to claim 1, wherein the plurality of types of information on the operation environment of the fishing tools includes at least a start time and an end time for the use of the fishing tools, a weather condition when the fishing tools are used, and a location where the fishing tools are used.

4. The fishing information management system according to claim 1, wherein the operation/environment information detector includes at least a reel operation information detector configured to detect operation information of the fishing reel, and a fishing rod operation information detector configured to detect operation information of the fishing rod.

5. The fishing information management system according to claim 1, wherein the plurality of types of information on the operation and operation environment of the fishing reel includes at least one of a pulled-out amount of a drag of the fishing reel, a pulling-out speed of the drag of the fishing reel, a spool rotation start point, a spool rotation end point, a spool diameter, a maximum rotation speed of the spool, a rotation speed history of the spool, a brake setting, a motion of the fishing rod, and backlash information.

6. The fishing information management system according to claim 1, wherein the plurality of types of information on the operation and operation environment of the fishing rod includes at least one of a speed, an acceleration, a deformation amount, and a motion of, and a method of casting, a fishing rod.

7. The fishing information management system according to claim 1, wherein the processor is programed to cause the display to display another graph which the first axis includes either skill information or bite information, and the second axis includes any one of time, position information, weather information, or operation information.

8. The fishing information management system according to claim 1, wherein the hit score relates to catching fish.

9. The fishing information management system according to claim 1, wherein the detailed view of the information on the operation and operation environment of the fishing tools at the first time of the plurality of times includes at least values of the hit score related to catching fish or information on the fish caught.

10. The fishing information management system according to claim 9, wherein the information on the fish caught includes image data of the fish.

11. The fishing information management system according to claim 1, wherein
  the plurality of types of information on the operation and operation environment includes a lure used for each casting and dropping, and
  the graph includes a plurality of lines representing the hit score as a function of the retrieving speed for a plurality of the lures.

* * * * *